Dec. 17, 1957    W. E. FAIRFIELD    2,816,364
ADJUSTABLE DEPTH FLUSH PIN GAUGE
Filed March 19, 1956

INVENTOR.
WILLIAM E. FAIRFIELD
BY
ATTORNEYS

United States Patent Office 2,816,364
Patented Dec. 17, 1957

2,816,364

ADJUSTABLE DEPTH FLUSH PIN GAUGE

William E. Fairfield, Oak Lawn, Ill., assignor to Size Control Company, a division of American Gage & Machine Company, Chicago, Ill., a corporation of Illinois Application March 19, 1956, Serial No. 572,337

2 Claims. (Cl. 33—170)

This invention relates to flush pin gages and has for an object to provide for a device of this character in which it is not necessary to provide a single gage for single depth of hole as the device is adjustable and may be set quickly and accurately to different depth settings.

A further object of the invention is to provide a flush pin gage such that the number of such gages required in the shop may be reduced.

A still further object of the invention is to provide a gage which may be used to determine that the hole falls within the tolerance limits of depth.

Other and further objects and advantages will appear in the following description taken with the accompanying drawings in which like characters of reference designate similar elements in the several views, and in which.

Flush pin gages presently in use consist of a cylindrical pin of exact diameter and length, integral with a larger cylinder forming a stop shoulder and handle. Such a device obviously will gage only one depth of hole and will not, by itself, indicate whether the hole so gaged falls within the permitted tolerance of depth.

Figure 1:
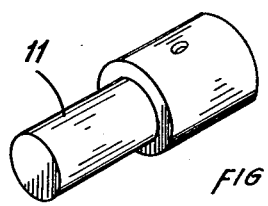
Figure 1 is a perspective view of the device of the invention.
Figure 2:
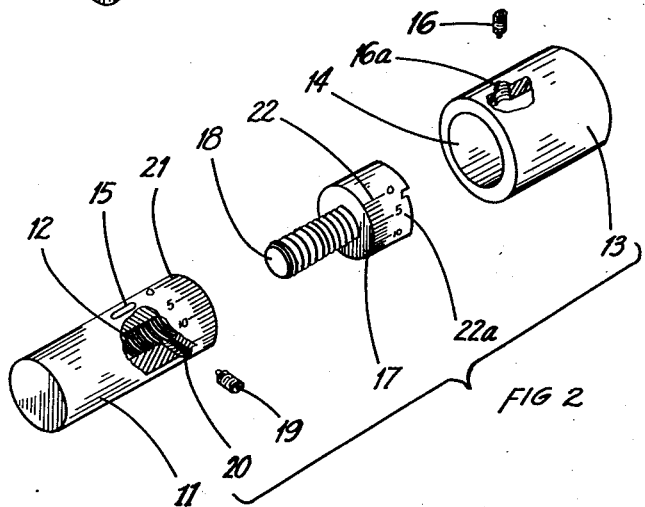
Figure 2 is an exploded view, partly broken away, of the device of Figure 1.
Figure 3:
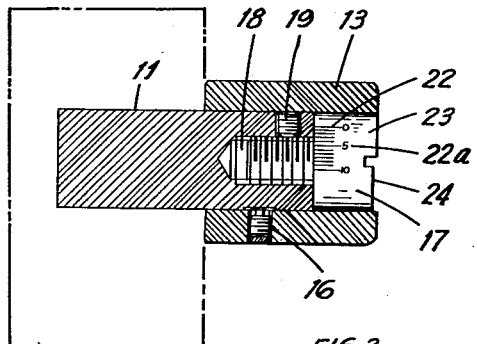
Figure 3 is a sectional view of the device.
Figure 4:
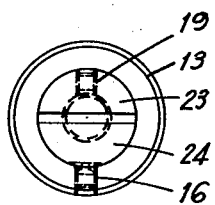
Figure 4 is an end view.

Such gages have the appearance of the device of Figure 1. However, the device of the present invention as seen in Figures 2 and 3 comprises several elements which increase its usefulness.

A pin 11 is provided of an appropriate and accurately ground diameter which is provided with an axial screw threaded bore 12 in one end. A head element 13 providing a handle and shoulder is formed with an axial bore 14 to slidingly receive the pin 11. The pin 11 is also provided with a flat or slot 15, axial of the pin and engageable by a guide pin 16, screw threaded into a radial opening 16a in head element 13. An adjusting element 17, forming an extension of pin element 11, and accurately ground to the same diameter as pin 11 is provided with a screw threaded extension 18 fitting into the screw threaded bore 12. A set screw 19, in a radial screw threaded hole 20, secures elements 11 and 17 in an axially adjusted position.

There is provided on the peripheral surface of pin 11 at its end a micrometer scale 21, and on the peripheral surface at the inner edge of adjusting element 17 there is provided a datum 22 and a vernier scale 22a, corresponding to the scale 21 on pin 11.

The outer end of adjusting element 17 is provided with two radial surfaces 23 and 24. These radial surfaces are spaced axially of the adjusting element 17, a distance equal to the tolerance of depth permitted in the holes to be gaged.

The guide pin 16, when in position lies below the cylindrical surface of element 13 so that a wax seal may be used to prevent unauthorized readjustment of the gauge.

As will be seen in Figure 3, the pin 11, 17, having been adjusted and assembled in the head or handle element 13 which is slidable along the pin, the pin 11 may be inserted in a hole in the work piece 25 to gage the depth. In this figure it will be noticed that the surface 23 is flush with the outer end of the head 13, indicating that the hole is of the depth equal to the greatest depth tolerance. It will be understood that had the surface 24 been flush with the end of the head 13, it would indicate that the hole was of a depth equal to the least tolerance. It will be seen therefore, that the device of the present invention will quickly and accurately indicate whether the hole being aged is too shallow, in which case both surfaces 23 and 24 lie outside of the head element 13, or is too deep, in which case the surfaces 23 and 24 both lie entirely within the head element 13, or that the hole depth is acceptable, when the plane of the end of head 13 coincides with or lies between planes 23 and 24.

It has been the practice, and necessary, to provide a different pin gage for each required depth hole for each diameter. It will be apparent from consideration of Figure 3 that a considerable variation in depth of holes that may be gaged by the device of the present invention may be effected by adjustment of element 17 with respect to element 11, and accuracy of this adjustment is assured by use of the scale 21 and vernier 22a.

In setting up for a particular job the pin gage head 13 would be removed and set screw 19 loosened and adjusting element 17 would be turned with respect to pin 11 until the desired length of pin was measured by the scale and vernier. The set screw 19 would then be tightened, the assembled pin 11, 17 would be mounted in the head 13, guide pin 16 would be adjusted, and a wax seal applied over the pin 16. The pin gage would then be used in the manner explained above.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. A cylindrical flush pin gage comprising a first cylindrical portion of predetermined diameter having a micrometric scale peripherally established around one end thereof and an axial bore extending inwardly from said end a substantial distance, said bore having a micrometric thread extending to the bottom of said bore; a second cylindrical portion of the same diameter having a datum at one peripheral end and an axial stud having a micrometric thread extending the full length of said stud and adapted to be received by said bore to provide a single pin of predetermined length when said portions are brought into abutting relation as the beginning of said scale is brought into alignment with said datum, which pin can be increased to predetermined lengths in accordance with said scale as said portions are relatively rotated away from each other; means adjacent said scale penetrating said first portion and engaging said thread to hold said portions in adjustable position; a hollow cylindrical handle element of shorter length than the combined lengths of said pin portions slidably to receive the same and terminating in inner radial stop shoulders and outer radial gaging shoulders of equal length about said pin to measure the depth of a hole of a work-piece of lesser diameter than said element when the radial stop abuts the work-piece around said hole, the length of the pin portions constituting the pin being equal to the sum of the depth of said hole and the length of said element, so that when one end of the pin is flush with the outer radial shoulder, the pin extends from the element a distance to measure a hole of the desired depth; and means penetrating said handle element and engaging said first portion to limit the sliding of the pin in said element but holding the pin assembled in position therein.

2. The flush pin gage of claim 1 in which the end of the pin on which the handle element is mounted is provided with two surfaces spaced from each other a distance such that when one is flush with the end surface of the element, the pin extends from the element a distance to measure a hole of the least depth tolerance, and when the other is flush with the end surface of the element the pin extends from the element a distance to measure a hole of the greatest depth tolerance.

References Cited in the file of this patent

UNITED STATES PATENTS

| | | |
|---|---|---|
| 1,307,426 | Wells | June 24, 1919 |
| 2,466,185 | Stoothoff | Apr. 5, 1949 |
| 2,560,177 | Kessler | July 10, 1951 |
| 2,631,377 | Steczynski | Mar. 17, 1953 |

FOREIGN PATENTS

| | | |
|---|---|---|
| 973,625 | France | Sept. 20, 1950 |